(12) United States Patent
Zetko-White (10) Patent No.: US 7,107,167 B2
(45) Date of Patent: Sep. 12, 2006

(54) METHOD AND APPARATUS FOR SEARCHING EXTERNAL ISSUES FOR TESTING A PRODUCT

(75) Inventor: Tracy Zetko-White, El Cajon, CA (US)

(73) Assignee: Qualcomm Inc., San Diego, CA (US)

( * ) Notice: Subject to any disclaimer, the term of this patent is extended or adjusted under 35 U.S.C. 154(b) by 228 days.

(21) Appl. No.: 10/620,754

(22) Filed: Jul. 15, 2003

(65) Prior Publication Data

US 2005/0027485 A1  Feb. 3, 2005

(51) Int. Cl.
*G06F 11/30* (2006.01)
(52) U.S. Cl. ....................................................... 702/82
(58) Field of Classification Search .................. 702/82, 702/185
See application file for complete search history.

(56) References Cited

U.S. PATENT DOCUMENTS

2004/0186686 A1\* 9/2004 Hsia ............................ 702/185
2005/0175231 A1\* 8/2005 Hirata et al. ................. 382/141

\* cited by examiner

*Primary Examiner*—John Barlow
*Assistant Examiner*—Cindy D. Khuu
(74) *Attorney, Agent, or Firm*—Philip R. Wadsworth; Robert J. O'Connell; Christopher S. Chow (57) ABSTRACT

Methods and apparatus for performing a test on a product include applying a test on a product and, if the test indicates a defect in the product, determining whether the defect is external to the product. The method further includes, if the defect is determined to be external to the product, skipping repair of the product for the defect. In one aspect, a method for performing a test on a product includes determining an external defect for the product and, if an external defect exists for the product, skipping further testing of the product for the determined external defect.

30 Claims, 8 Drawing Sheets

FIG. 1

RESULTS OF YOUR SEARCH

1. "LOCK" does not work on the Samsung i300 phone. There is no way to programmatically lock this device.

| PRINT RESULTS | BACK |

FIG. 2

EXTERNAL-ISSUE-SEARCH USER INTERFACE

This user interface (UI) allows you to search for external issues that may affect testing of your new product. The search criteria may be based on a field, a keyword, or any combination of fields and keywords. In addition, the search may be performed as an "AND" search or an "OR" search. An "AND" search returns results that match all of the specified search criteria. This is helpful if you would like specific, streamlined results. An "OR" search returns results that match one or more of the specified search criteria. This is useful if you would like a more general list of external issues.

Please enter your search criteria in the text boxes below and check either the "AND Search" or the "OR Search" checkbox. After you press the "SUBMIT" button, a list of results matching your search criteria will be returned to you. You may print out these results if you wish.

PROJECT NAME

DEVICE

PLATFORM (i.e. WML)

WML ←—322

BROWSER VERSION, IF AVAILABLE

AREA (i.e. EMAIL)

KEYWORD

☐ "AND"   ☐ "OR"

SUBMIT   CLEAR FORM

FIG. 3

RESULTS OF YOUR SEARCH

1. The dollar sign ($) in an email address will cause a "compiler error" on the WML phones.

| PRINT RESULTS | BACK |

FIG. 4

EXTERNAL-ISSUE-SEARCH USER INTERFACE

This user interface (UI) allows you to search for external issues that may affect testing of your new product. The search criteria may be based on a field, a keyword, or any combination of fields and keywords. In addition, the search may be performed as an "AND" search or an "OR" search. An "AND" search returns results that match all of the specified search criteria. This is helpful if you would like specific, streamlined results. An "OR" search returns results that match one or more of the specified search criteria. This is useful if you would like a more general list of external issues.

Please enter your search criteria in the text boxes below and check either the "AND Search" or the "OR Search" checkbox. After you press the "SUBMIT" button, a list of results matching your search criteria will be returned to you. You may print out these results if you wish.

| PROJECT NAME | DEVICE |
| --- | --- |
| WSE ←—522 | Samsung i300 ←—524 |

| PLATFORM (i.e. WML) | BROWSER VERSION, IF AVAILABLE |
| --- | --- |
| WML ←—526 | |

| AREA (i.e. EMAIL) | KEYWORD |
| --- | --- |
| | |

[X] "AND"  ← 528        [ ] "OR"

[ SUBMIT ]        [ CLEAR FORM ]

FIG. 5

RESULTS OF YOUR SEARCH

1. "LOCK" does not work on the Samsung i30Q;  There is no way to
programmatically lock this device.

```
The product relies on a Palm OS resident application
named "security" to lock a Palm device.  This app-
lication has been altered on the Samsung i300 device.
```

[PRINT RESULTS]   [BACK]

METHOD AND APPARATUS FOR SEARCHING EXTERNAL ISSUES FOR TESTING A PRODUCT

FIELD

The present invention relates to quality control of an article of manufacture. More specifically, the present invention relates to methods and apparatus for searching external issues that may affect the testing of a product.

BACKGROUND

A product may be tested for quality assurance according to a set of predetermined test cases, usually stored in a test case database. If the test indicates that that product has a defect, the defect is tracked in a defect-tracking database. Usually, the product operates in conjunction with some external software or hardware modules. When the product shows a defect as a result of a test procedure, the defect may be due to the external issues, while the product may be in fact free of any defect. A great deal of time and research is usually required to determine the cause and the origin of these external issues. For example, if a software product runs on a phone, some known external issues associated with the phone may cause the software to not operate as expected. Considerable time and effort would be saved if the external issues are readily known before a product goes under testing.

There is a need, therefore, for an efficient mechanism for searching a compilation of known external issues.

SUMMARY

The disclosed embodiments provide novel and improved methods and apparatus for searching external issues before performing a test on a product. In one aspect, the method includes applying a test on a product and, if the test indicates a defect in the product, determining whether the defect is external to the product. The method further includes, if the defect is determined to be external to the product, skipping repair of the product for the defect.

In one aspect, method for performing a test on a product includes determining an external defect for the product and, if an external defect exists for the product, skipping further testing of the product for the determined external defect.

In one aspect, an apparatus for testing a new product includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of disclosed embodiments set forth below when taken in conjunction with the drawings, and wherein.

DETAILED DESCRIPTION

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

A product may be tested for quality assurance according to a set of predetermined test cases, usually stored in a test case database. If the test indicates that that product has a defect, the defect is tracked in a defect-tracking database. Usually, the product operates in conjunction with some external software or hardware modules. When the product shows a defect as a result of a test procedure, the defect may be due to the external issues, while the product may be in fact free of any defect. A great deal of time and research is usually required to determine the cause and the origin of these external issues. For example, if a software product runs on a phone, some known external issues associated with the phone may cause the software to not operate as expected. Considerable time and effort would be saved if the external issues are readily known before a product goes under testing.

In one embodiment, the known defects or issues that are external to a product but still have the potential to affect the testing of the product are compiled in one central database. The external-issue database is organized based on searchable fields, such as previously tested products, device names, browsers, platforms. The external-issue database also includes some descriptions of the external issues that affect testing the product. A flexible user interface allows users to search on one or more keywords, fields, or a combination thereof, and access the information that relates to a particular product.

Figure 1:
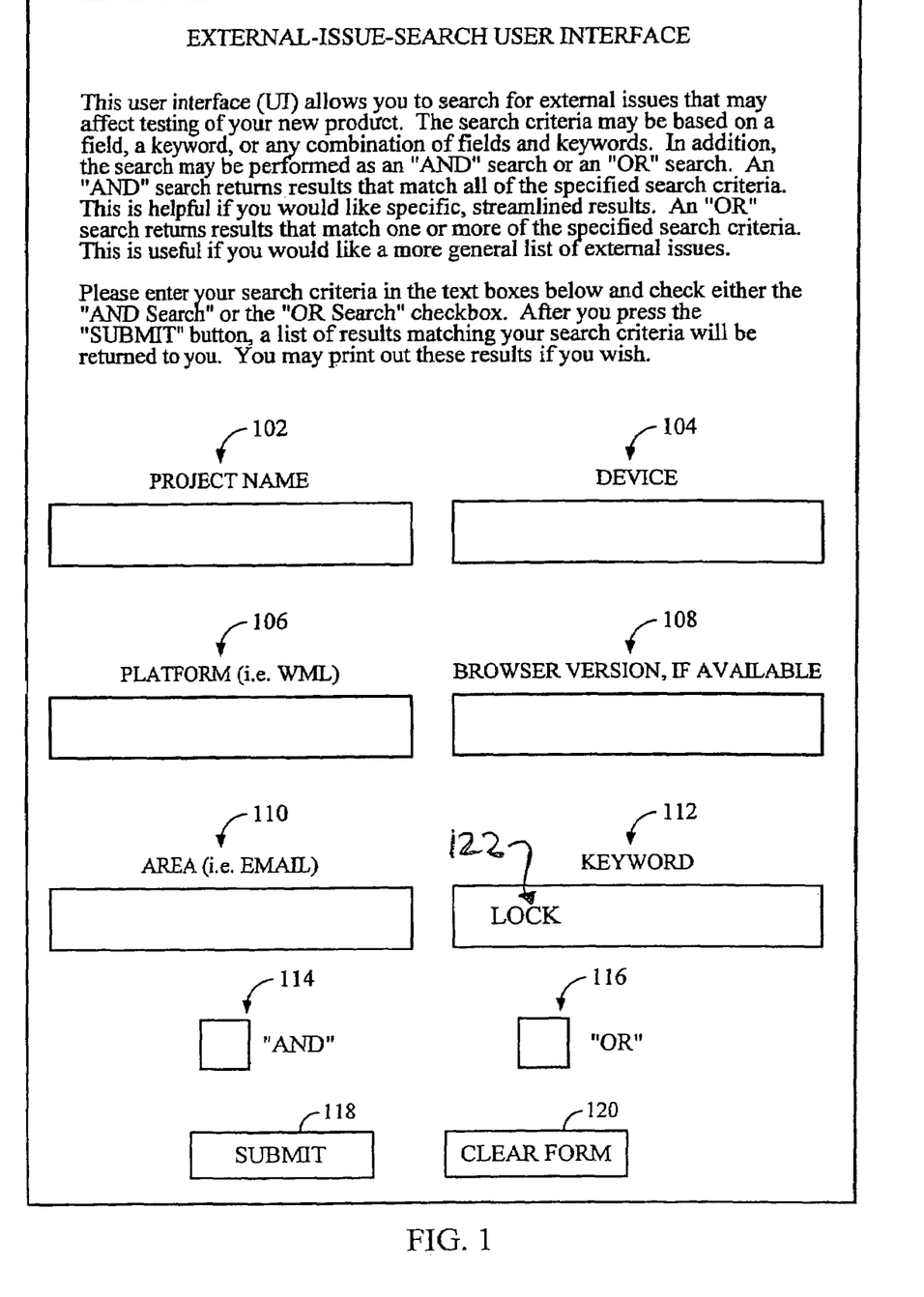
FIG. 1 illustrates an external-issue-search user interface for searching a keyword.

FIG. 1 illustrates an external-issue-search user interface for searching an external-issue database, according to one embodiment. The user interface allows searching for external issues that may affect testing of a new product. The search criteria may be based on a field, such as a product or project name 102, a device 104, a platform 106, a browser 108, and an area 110, for example, which relate to software and hardware entities that may operate in conjunction with the new product. Searches are executed by filling in the appropriate filed or fields 102, 104, 106, 108, 110, 112, 114, and 116 and then selecting a submit button 118. Alternatively, to enter a new search, the clear form button 120 may be selected to clear previously entered search criteria.

A search based on the search field "project name" 102 retrieves the external issues listed in the external-issue database under the product name, product project name, or an earlier version of the product. A search based on the field "device name" 104 retrieves the external issues listed in the external-issue database under the devices that may operate in conjunction with the product. Examples of such devices include, a phone, a PDA, a portable computer, and the like.

A search based on the filed "platform" 106 retrieves the external issues listed in the external-issue database under a platform that may operate in conjunction with the product. Examples of a platform include Wireless Markup Language (WML), Hypertext Markup Language (HTML), Extensible Markup Language (XML), and the like.

A search based on the field "browser version" 108 retrieves the external issues listed in the external-issue database under the browser that may operate in conjunction with the product. Examples of a browser version include Internet Explorer and Netscape, and the like.

A search based on the field "area" retrieves the external issues listed in the external-issue database under an area that may operate in conjunction with the product.

Examples of an area include email, calendar, contacts, and the like.

The search criteria may be based on a keyword 112, such as "lock," 122 for programmatically locking a device. The lock may be a feature of a new software product that runs on specific target wireless phones, for example. Before testing the new software product for the lock feature, it is beneficial to determine if a specific target phone is known as not supporting this feature. If it is determined that the specific phone does not support the lock feature of the new software product, there would be no need to test the new software product for this feature.

Figure 2:
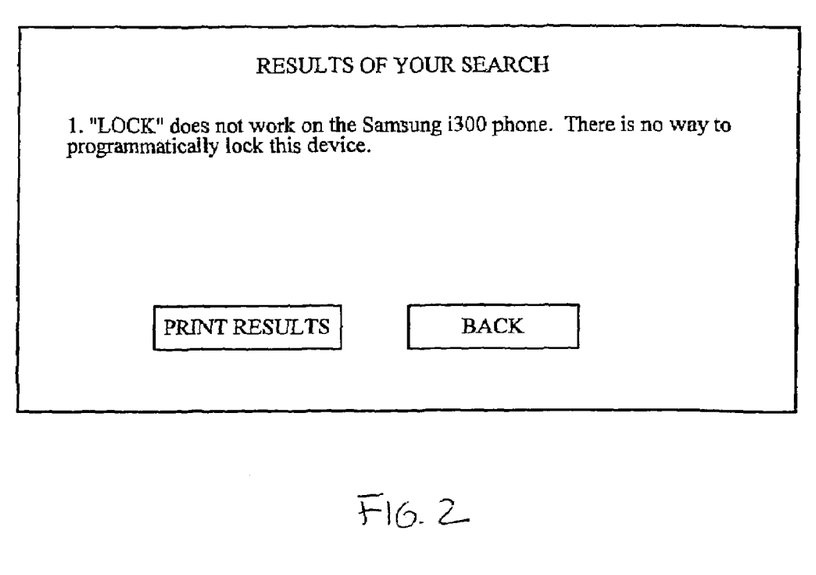
FIG. 2 illustrates a result for the search shown in FIG. 1.

FIG. 2 illustrates a search result for a search of the external database for the keyword "lock," as shown in FIG. 1, according to one embodiment. The result of searching the external-issue database for the keyword "lock" may be "Lock does not work on the Samsung i300 phone. There is no way to programmatically lock this device," indicating that the lock feature of the new software product does not work on this particular phone. Accordingly, the new software may not be tested for this feature, saving considerable time and effort.

Figure 3:
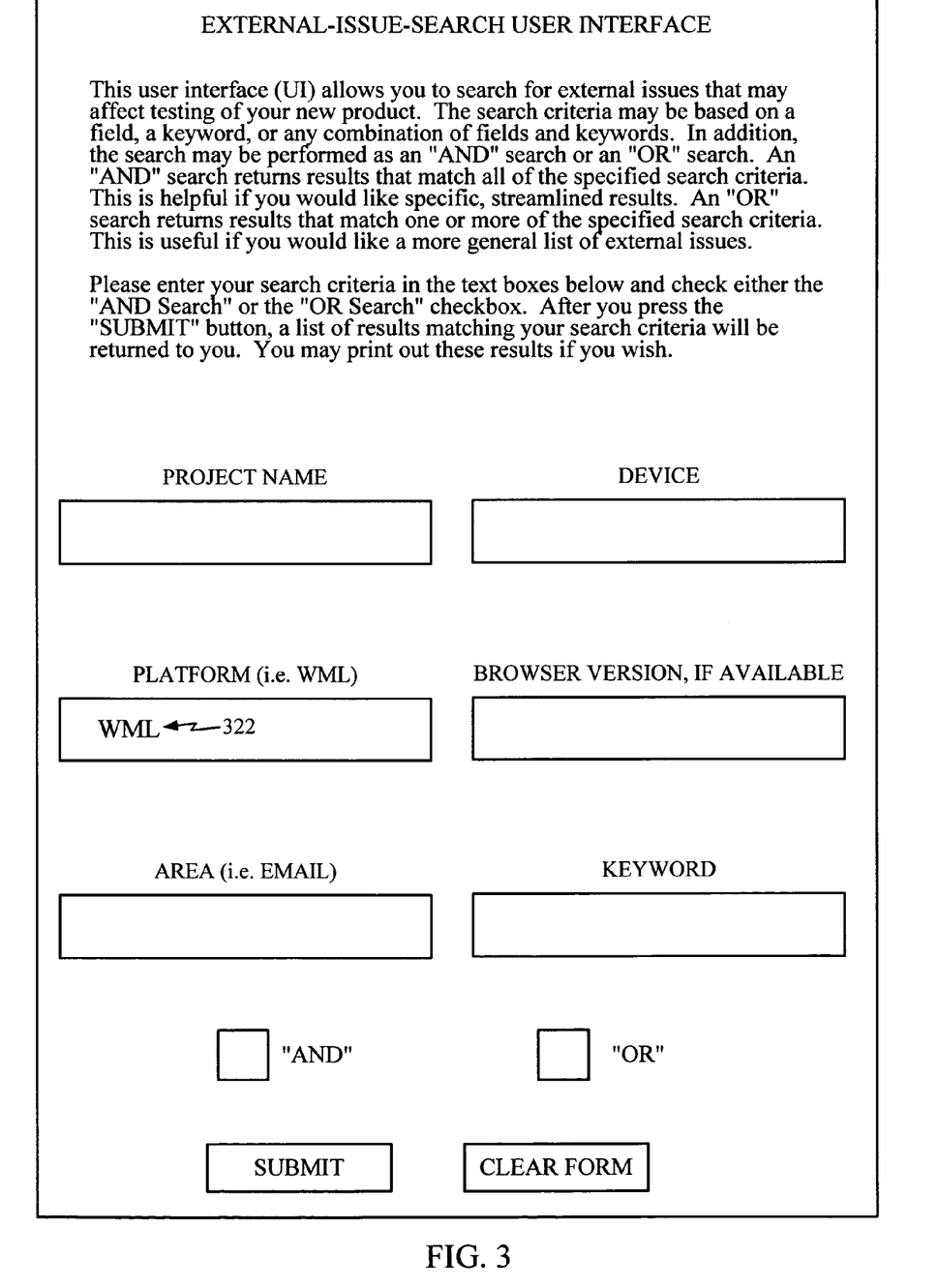
FIG. 3 illustrates an external-issue-search user interface for searching a field.
Figure 4:
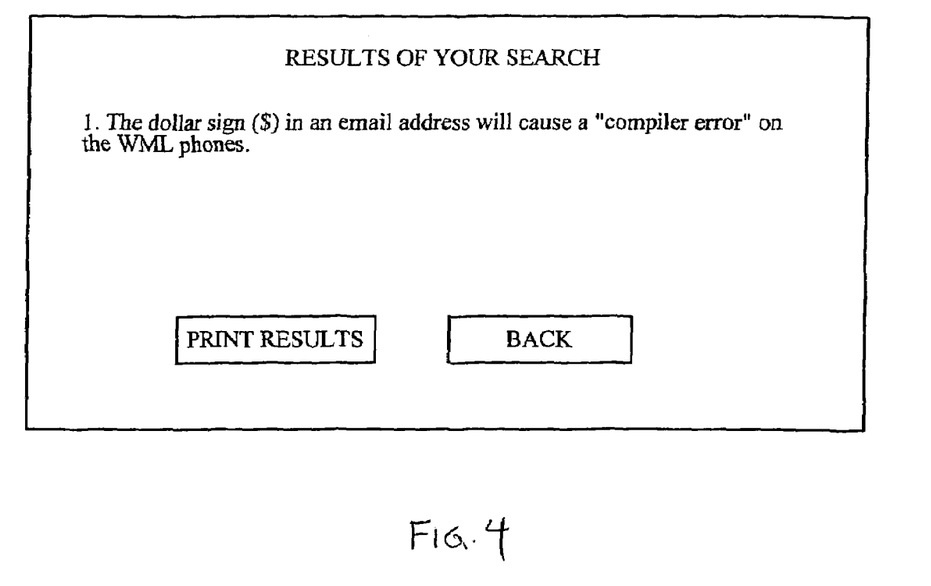
FIG. 4 illustrates a result for the search shown in FIG. 3.

The search criteria may be based on external-issue database fields 102, 104, 106, 108, 110. FIG. 3 illustrates an external-issue-search user interface for searching the external-issue database based on a field, such as WML platform 322, according to one embodiment. FIG. 4 shows the search result for searching the external-issue database based on the platform "WML," as shown in FIG. 3. The result of searching the external-issue database for the filed "WML" may be "The dollar sign ($) in an email address will cause a "compile error" on the WML phones."

Figure 5:
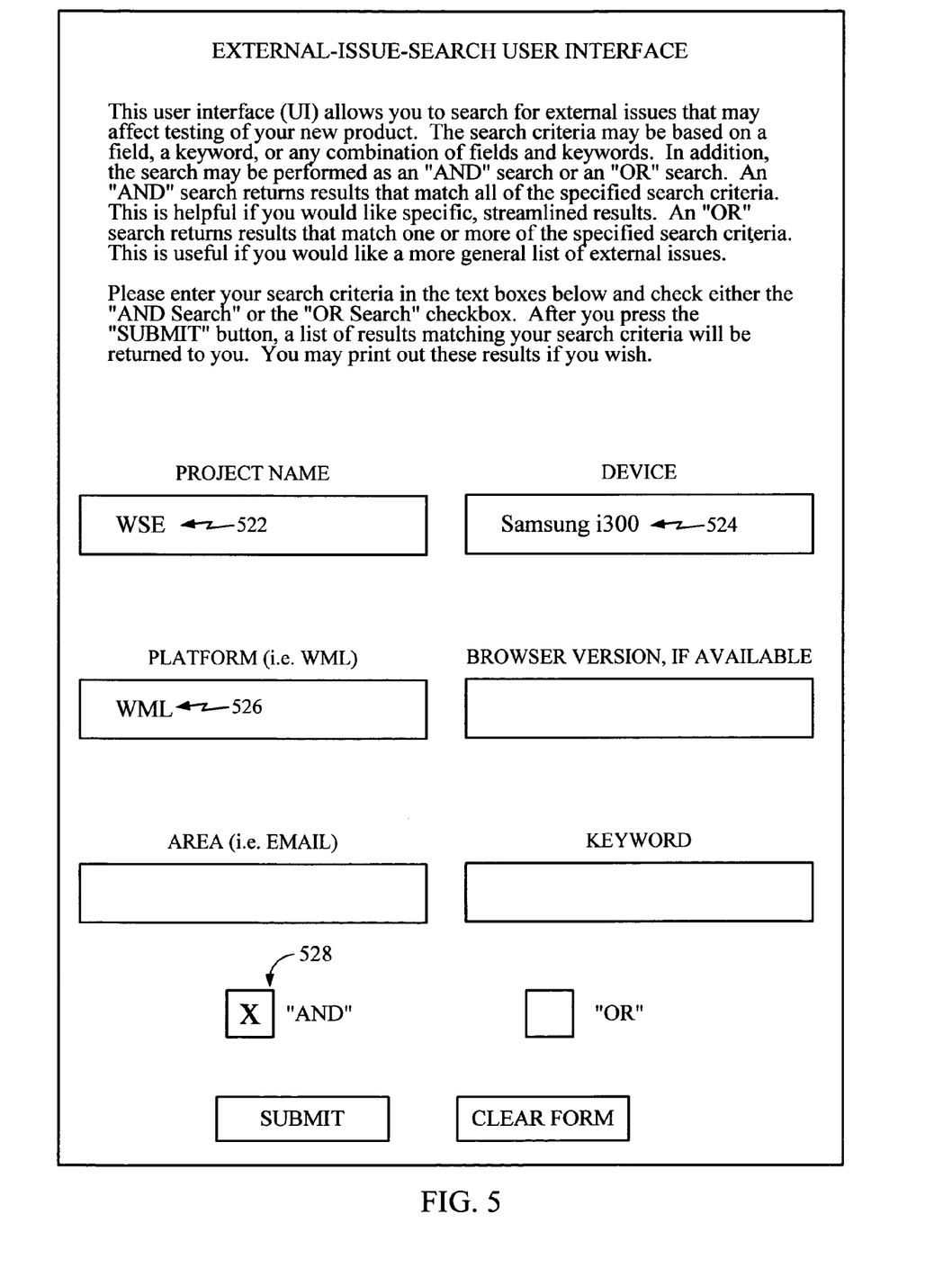
FIG. 5 illustrates an external-issue-search user interface for searching a combination of keywords and fields.
Figure 6:
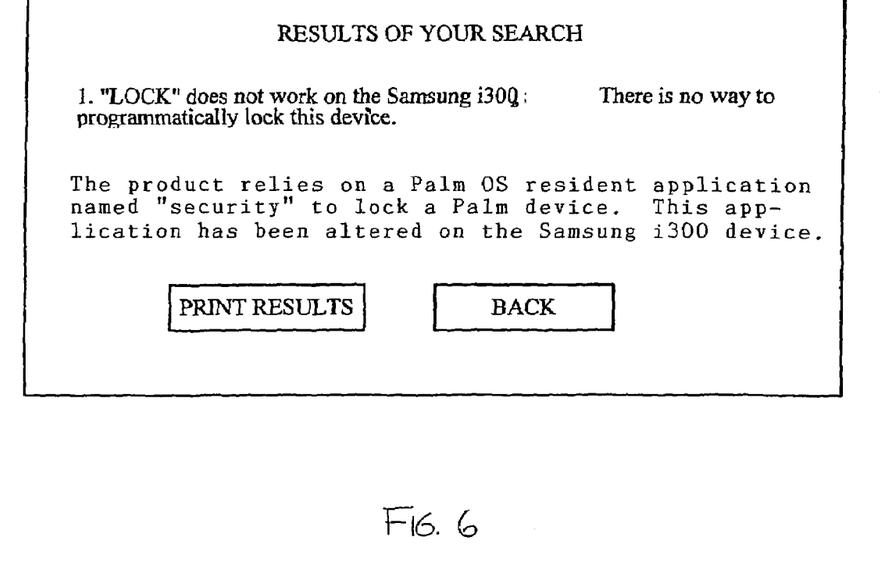
FIG. 6 illustrates a result for the search shown in FIG. 5.

FIG. 5 illustrates an external-issue-search user interface for searching the external-issue database based on a combination of fields, such as the product version "WSE" 522 for the product, the device name for "Samsung i300" phone 524, and platform "Palm" 526, according to one embodiment. The result of searching the external issue based on these fields is shown in FIG. 6, as "Lock does not work on the Samsung i300. There is no way to programmatically lock this device. The product relies on a Palm OS resident application named "Security" to lock a Palm device. This application has been altered on Samsung i300 device."

The search of the external-issue database for an external issue or defect may also be based on a combination of fields and keywords. The search may be performed as an "AND" search 114 or an "OR" search 116. An "AND" search returns results that match all of specified search criteria. This is helpful for a specific, streamlined result. An "OR" search returns results that match one or more of the specified search criteria. This is useful for a more general list of external issues.

Figure 7:
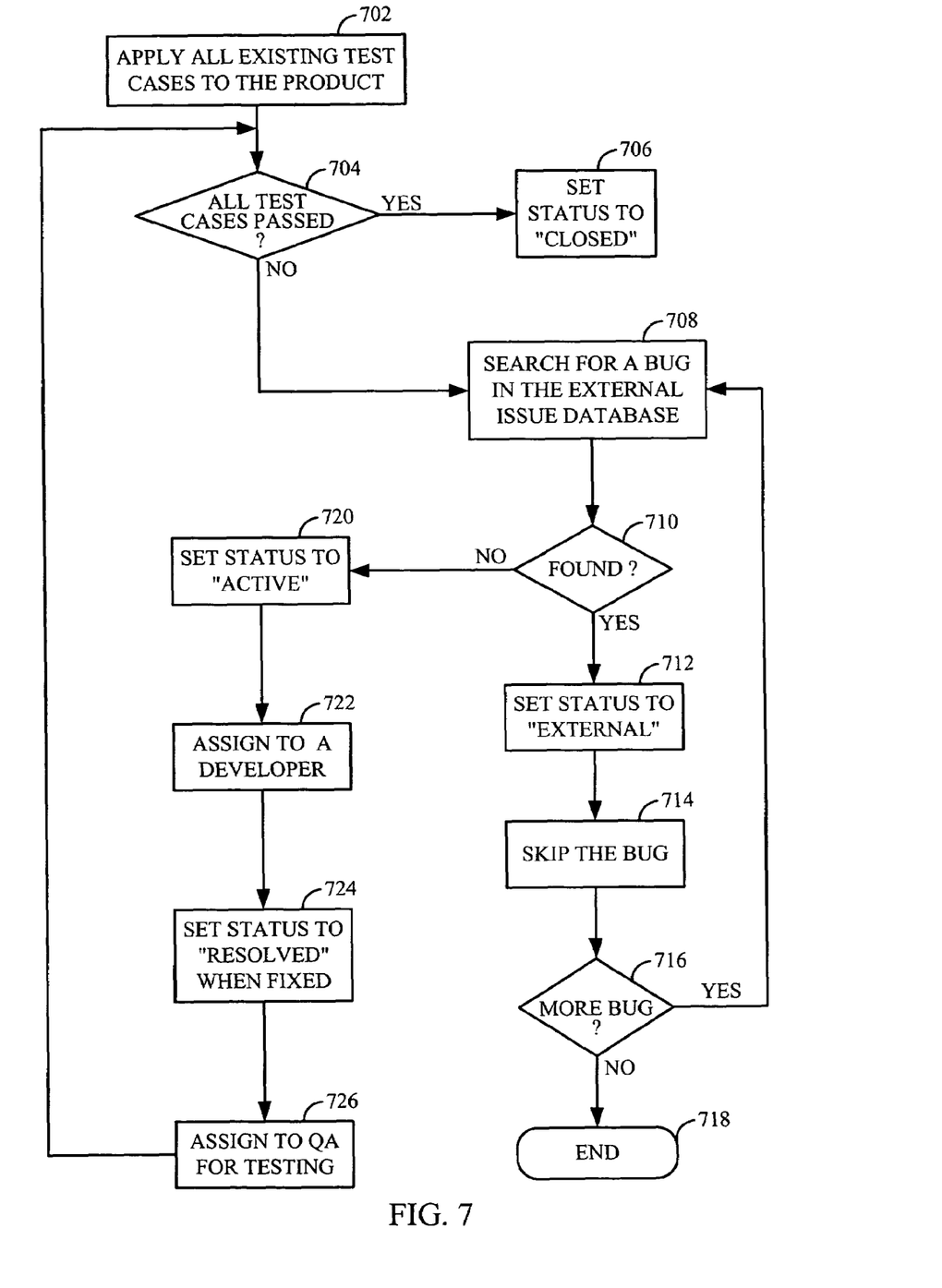
FIG. 7 illustrates a flow chart for testing a product.

FIG. 7 illustrates a flow chart for testing a product, according to one embodiment. After a product is tested against all existing test cases, in step 702, if no defect is found, in step 704, a status field is set to "closed," in step 706, indicating that the product has successfully passed all the test cases and it is free of any defect. The test case is then closed and kept in the database for testing future versions of the product. However, if a defect is found in the product, in step 704, an external-issue database is searched, in step 708, to determine whether the defect is external to the product under the test. If the defect is determined, in step 710, to be external to the product under the test, the status field is set to "external," in step 712, indicating that the product in fact is free of the defect. Accordingly, the repair on this defect may be skipped, in step 714. If there are more defects determined in step 716, the process of searching the external database is repeated by going through steps 708 through 716. If all defects are found to be external to the product under the test, the product may not need any repair, and the process ends in step 718.

However, if any of the defects detected in step 704 is determined not to belong to external issues, in step 710, the status of such defect is set to "active," in step 720, meaning that the product needs to be repaired to fix the defect. The product is then assigned to a developer for repair, in step 722. After the defect is fixed, the status field is set to "resolved," in step 724, and the product is assigned to quality assurance for retesting, in step 726. The process continues until all defects that relate to the product are finally repaired and their status fields are changed to "closed."

The detected defects that relate to the product are reported in the database as test cases for testing future versions or updates of the product. Upon testing a new release of the product, the previously detected and reported defects are re-opened as test cases, which are applied in testing the new versions of the product. New test cases, which include defects reported by customers and/or users of the product, may also be entered in the database for future testing.

Figure 8:
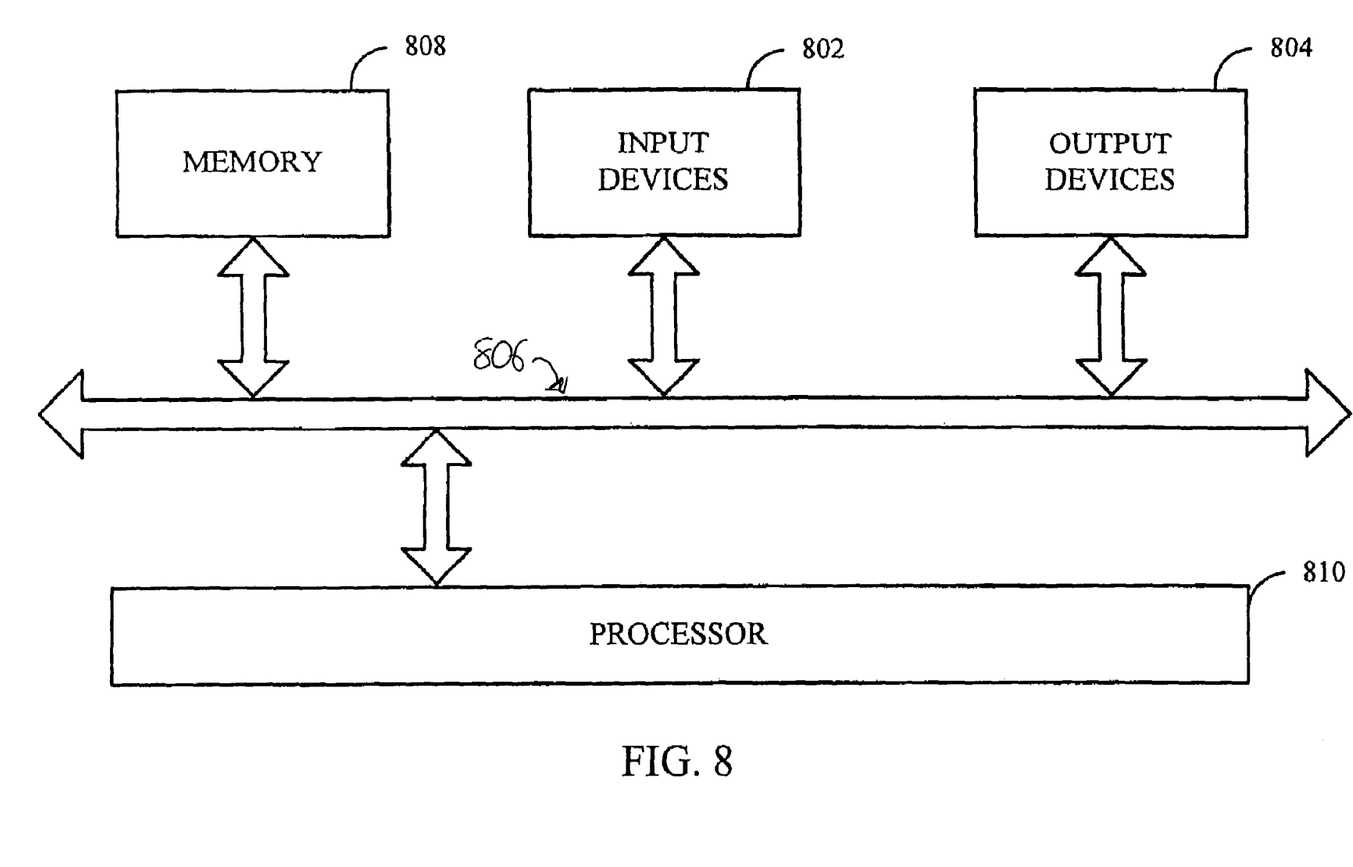
FIG. 8 illustrates one embodiment of an apparatus for testing a product.

FIG. 8 illustrates one embodiment of an apparatus for testing a product. The apparatus includes input devices 802 and a output devices 804. Communication bus 806 provides a common connection among other modules in FIG. 8. Communication bus 806 is further coupled to memory unit 808. Memory unit 808 stores computer readable instructions for a variety of operations and functions performed by the apparatus for testing a product. The processor 810 performs the instructions stored in memory unit 808.

Therefore, the disclosed embodiments provide for an efficient and reliable system and method for searching for external issues for testing a product.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration."

The invention claimed is:

1. A method for performing a test on a product, comprising:
    applying a test on a product;
    if the test indicates a defect in the product,
        determining whether the defect is external to the product, wherein said determining includes searching a database of external defects, said searching includes searching based on a field, and said field includes a product version, a device name, a platform, a browser, and an area; and
    if the defect is determined to be external to the product, skipping repair of the product for the defect.

2. The method of claim 1, wherein said searching includes searching based on a keyword.

3. The method of claim 1, wherein said searching includes searching based on a keyword and a field.

4. The method of claim 1, wherein said skipping further includes setting status of the defect to "external."

5. The method of claim 1, further including assigning the product for repair, if the defect is determined to be not external to the product.

6. The method of claim 5, wherein said assigning further includes setting status of the defect to "active."

7. A method for performing a test on a product, the method comprising:
    determining an external defect for the product, wherein said determining includes searching a database of external defects, said searching includes searching based on a field, and said field includes a product version, a device name, a platform, a browser, and an area; and
    if an external defect exists for the product,
    skipping further testing of the product for the determined external defect.

8. The method of claim 7, wherein said searching includes searching based on a keyword.

9. The method of claim 7, wherein said searching includes searching based on a keyword and a field.

10. The method of claim 7, wherein said skipping further includes setting status of the defect to "external."

11. A computer-readable medium storing instructions, which when executed by a computer causes the computer to perform a method for testing a product, the method comprising:
    applying a test on a product;
    if the test indicates a defect in the product,
        determining whether the defect is external to the product, wherein said determining includes searching a database of external defects, said searching includes searching based on a field, and said field includes a product version, a device name, a platform, a browser, and an area; and
    if the defect is determined to be external to the product, skipping repair of the product for the defect.

12. The computer-readable medium of claim 11, wherein said searching includes searching based on a keyword.

13. The computer-readable medium of claim 11, wherein said searching includes searching based on a keyword and a field.

14. The computer-readable medium of claim 11, wherein said skipping further includes setting status of the defect to "external."

15. The computer-readable medium of claim 11, the method further including assigning the product for repair, if the defect is determined to be not external to the product.

16. The computer-readable medium of claim 15, wherein said assigning further includes setting status of the defect to "active."

17. A computer-readable medium storing instructions, which when executed by a computer, causes the computer to perform a test on a product, the method comprising:
    determining an external defect for the product, wherein said determining includes searching a database of external defects, said searching includes searching based on a field, and said field includes a product version, a device name, a platform, a browser, and an area; and
    if an external defect exists for the product,
    skipping further testing of the product for the determined external defect.

18. The computer-readable medium of claim 17, wherein said searching includes searching based on a keyword.

19. The computer-readable medium of claim 17, wherein said searching includes searching based on a keyword and a field.

20. The computer-readable medium of claim 17, wherein said skipping further includes setting status of the defect to "external."

21. An apparatus for performing a test on a product, comprising:
   a means for applying a test on a product;
   a means for determining whether the defect is external to the product when the test indicates a defect in the product, wherein said means for determining includes a means for searching a database of external defects, said means for searching includes a means for searching based on a field, and said field includes a product version, a device name, a platform, a browser, and an area; and
   a means for skipping repair of the product for the defect, if the defect is determined to be external to the product.

22. The apparatus of claim 21, wherein said means for searching includes means for searching based on a keyword.

23. The apparatus of claim 21, wherein said means for searching includes means for searching based on a keyword and a field.

24. The apparatus of claim 21, wherein said means for skipping further includes means for setting status of the defect to "external."

25. The apparatus of claim 21, further including means for assigning the product for repair, if the defect is determined to be not external to the product.

26. The apparatus of claim 25, wherein said means for assigning further includes means for setting status of the defect to "active."

27. An apparatus for performing a test on a product, comprising:
   a means for determining an external defect for the product, wherein said means for determining includes a means for searching a database of external defects, said means for searching includes a means for searching based on a field, and said field includes a product version, a device name a platform, a browser, and an area; and
   a means for skipping further testing of the product for the determined external defect, if an external defect exists for the product.

28. The apparatus of claim 27, wherein said means for searching includes means for searching based on a keyword.

29. The apparatus of claim 27, wherein said means for searching includes means for searching based on a keyword and a field.

30. The apparatus of claim 27, wherein said means for skipping further includes means for setting status of the defect to "external."

* * * * *